United States Patent
Baum

[19]

[11] Patent Number: 5,805,106
[45] Date of Patent: Sep. 8, 1998

[54] DUAL POLARIZATION WAVE CLUTTER REDUCTION

[75] Inventor: Eric Baum, Rancho Palos Verdes, Calif.

[73] Assignee: TRW Inc., Redondo Beach, Calif.

[21] Appl. No.: 794,173

[22] Filed: Jan. 3, 1997

[51] Int. Cl.[6] .............................. G01S 7/28; G01S 13/50; G01S 13/534

[52] U.S. Cl. .................... 342/159; 342/162; 342/188; 342/196

[58] Field of Search ................................... 342/159, 160, 342/161, 162, 188, 196

[56] References Cited

U.S. PATENT DOCUMENTS

| | | | |
|---|---|---|---|
| 4,081,679 | 3/1978 | Cohn ........................................ | 250/338 |
| 4,137,532 | 1/1979 | Taylor, Jr. et al. ...................... | 342/93 |
| 4,231,037 | 10/1980 | Long ....................................... | 342/149 |
| 4,611,209 | 9/1986 | Lemelson et al. .................... | 342/455 X |
| 4,766,435 | 8/1988 | Wells ..................................... | 342/82 |
| 4,928,131 | 5/1990 | Onozawa ................................ | 342/188 |
| 5,005,147 | 4/1991 | Krishen et al. ......................... | 364/578 |
| 5,018,065 | 5/1991 | McWhirter et al. ................... | 364/900 |
| 5,228,009 | 7/1993 | Forestieri et al. ..................... | 367/135 |
| 5,233,541 | 8/1993 | Corwin et al. ......................... | 364/516 |
| 5,300,933 | 4/1994 | Discenza et al. ...................... | 342/36 |
| 5,337,055 | 8/1994 | Ghignoni ............................... | 342/93 |
| 5,416,724 | 5/1995 | Savic .................................... | 364/509 |
| 5,483,066 | 1/1996 | Sadjadi et al. ....................... | 250/338.1 |
| 5,483,240 | 1/1996 | Hsu et al. .............................. | 342/17 |
| 5,691,727 | 11/1997 | Cyzs ..................................... | 342/361 |

*Primary Examiner*—John B. Sotomayor
*Attorney, Agent, or Firm*—Michael S. Yatsko

[57] ABSTRACT

A system 10 for reducing clutter in passive radiometric images of the ocean surface, the system including: a first polarizer 12 for generating a vertically polarized image of a selected patch of the ocean surface, the vertically polarized image including a first set of radiance data; a second polarizer 14 for generating a horizontally polarized image of the selected patch of the ocean surface, the horizontally polarized image including a second set of radiance data; a processor 16 for computing a clutter reduction weighting factor from the first and the second sets of radiance data; and means 18 for combining the first set of radiance data with the second set of radiance data utilizing the weighting factor to generate a combined image with reduced wave clutter. The processor 16 includes means for computing a weighting factor for minimizing clutter-associated variance in the weighted combination of the first and the second sets of radiance data.

15 Claims, 9 Drawing Sheets

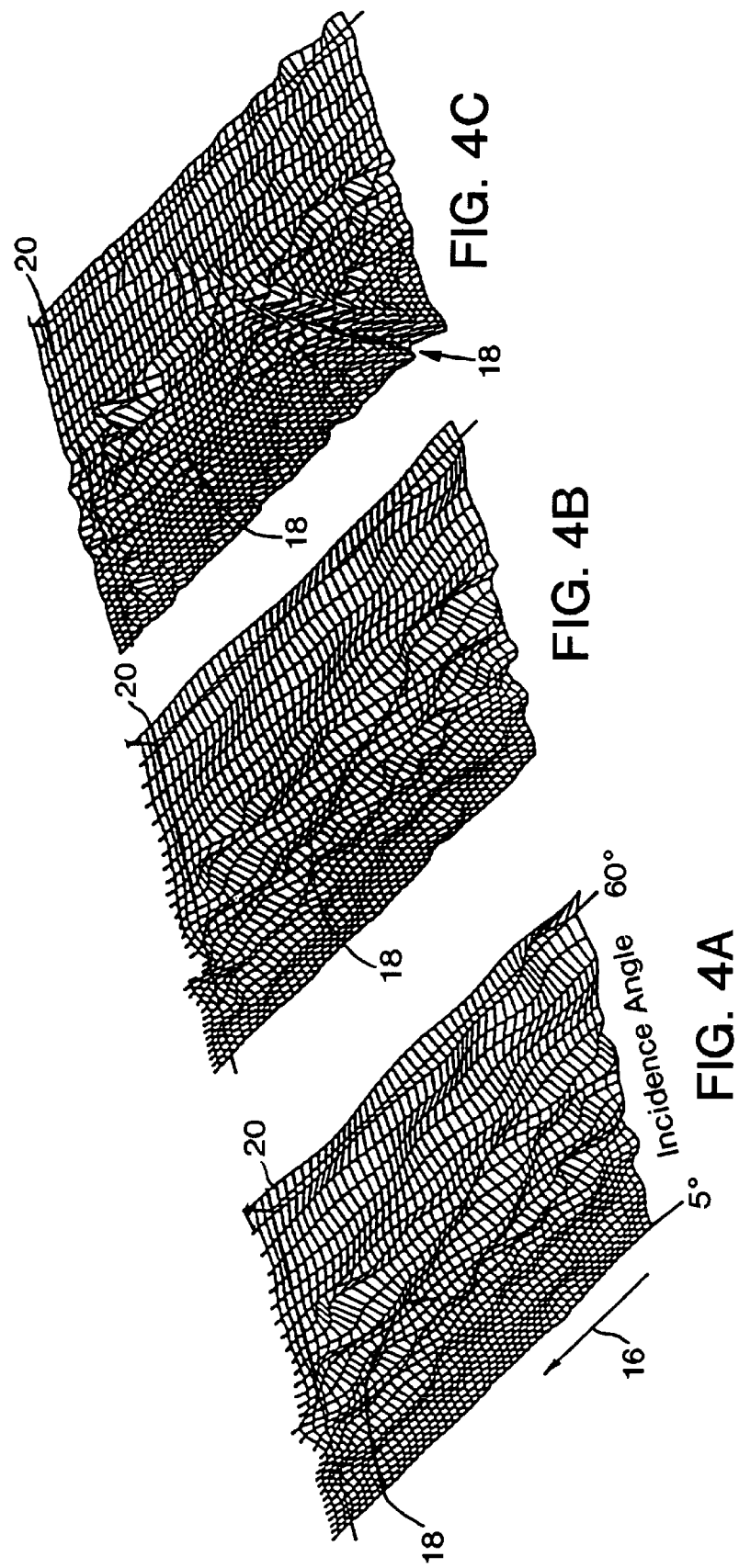

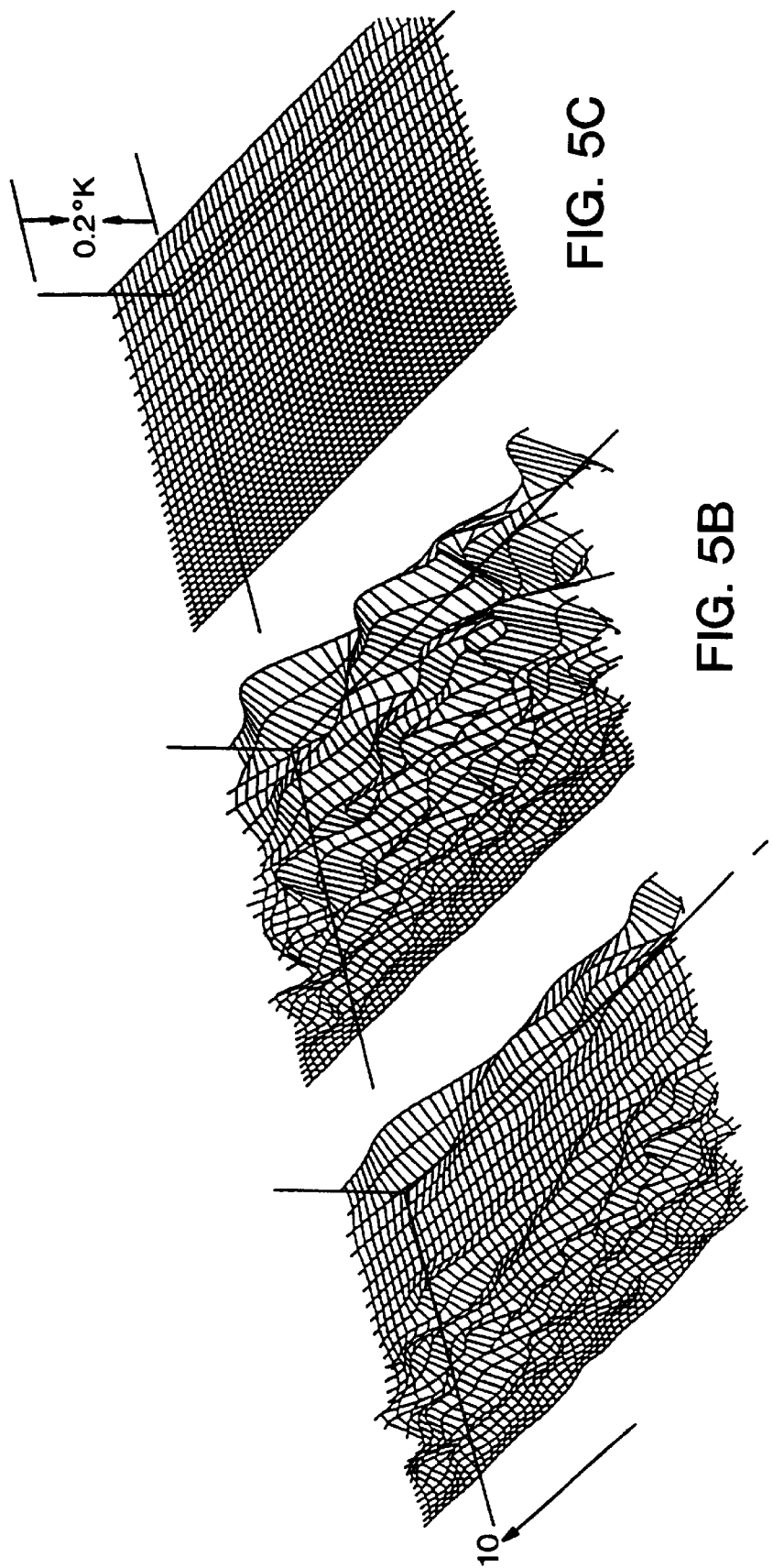

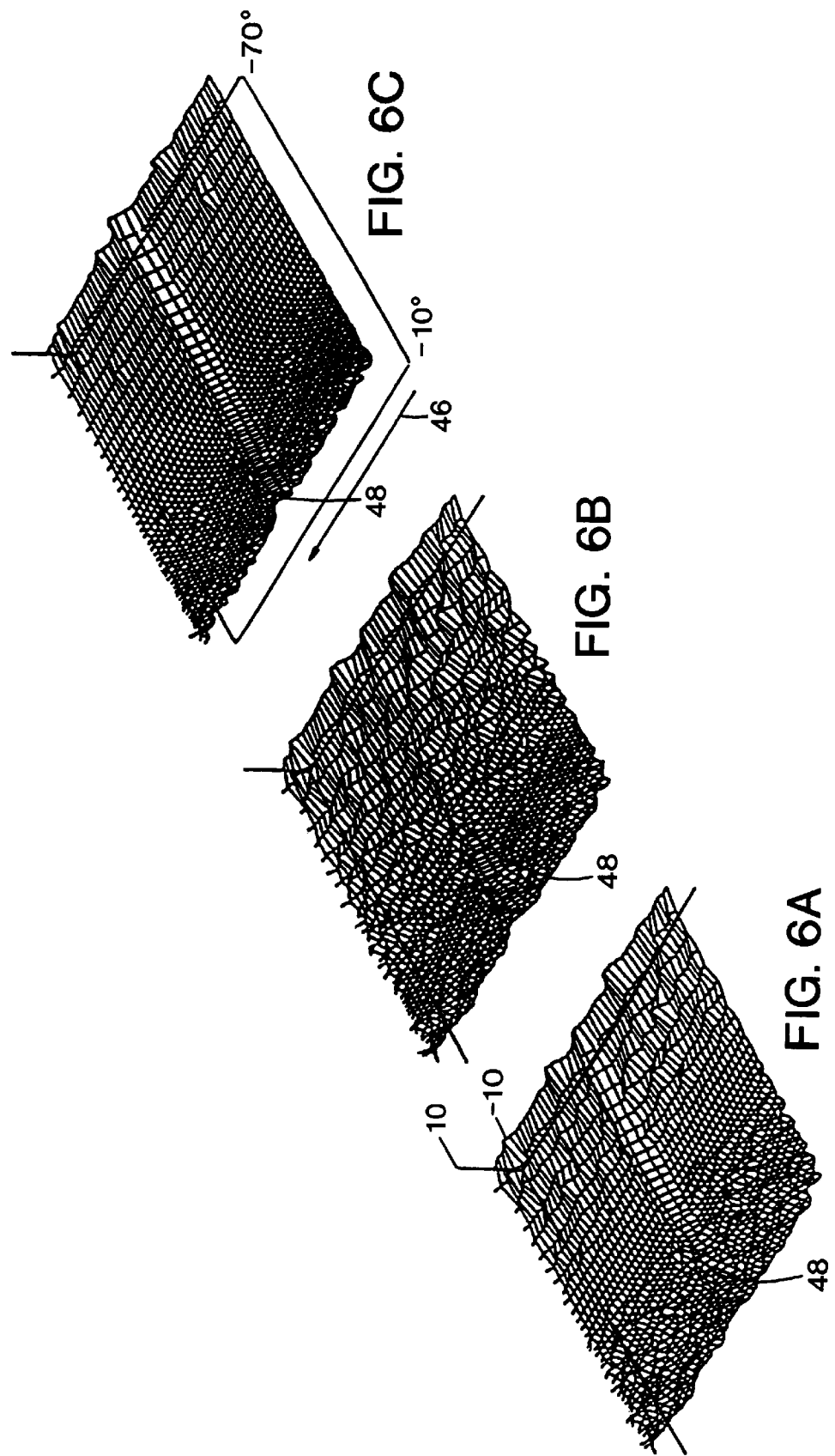

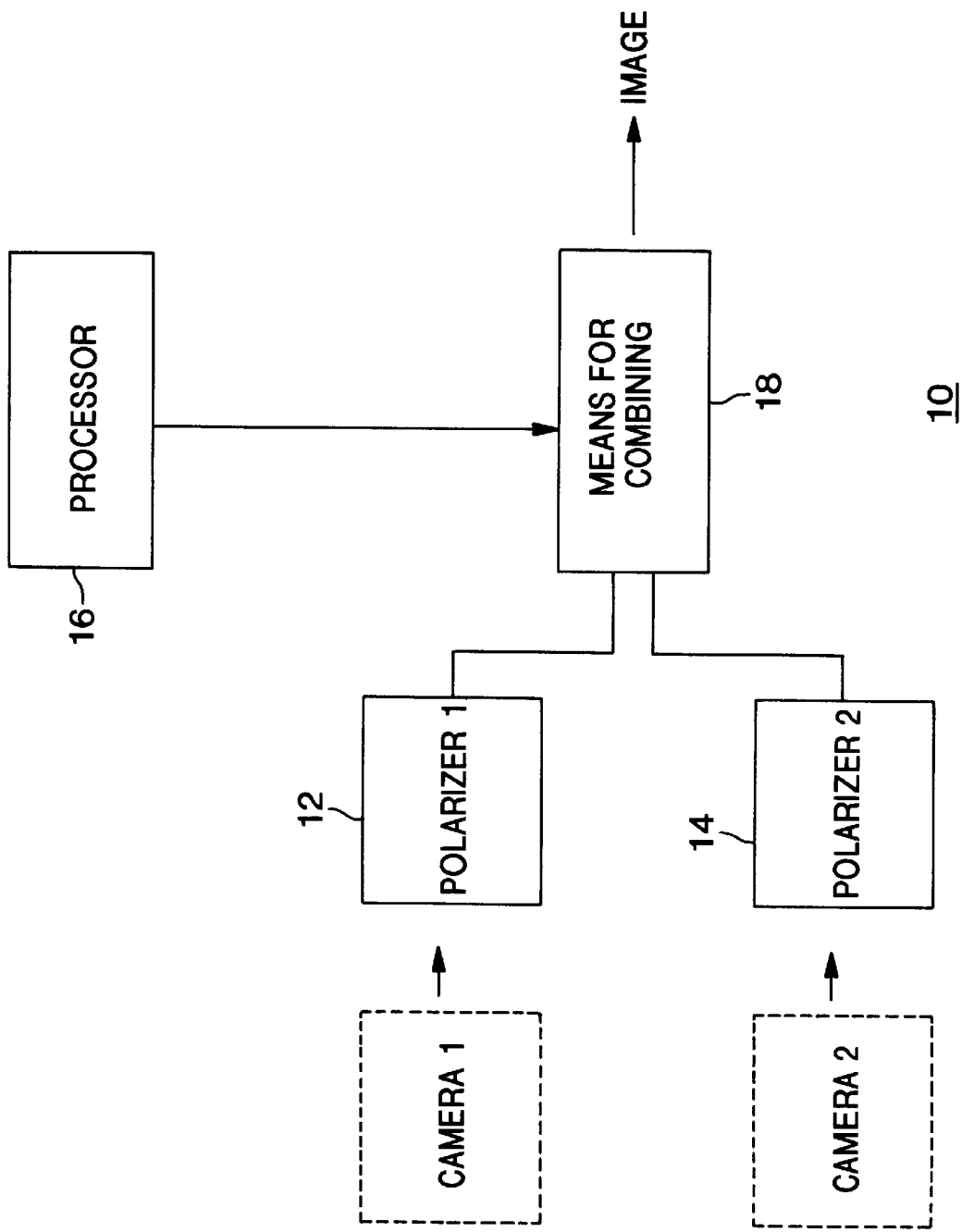

5,805,106

DUAL POLARIZATION WAVE CLUTTER REDUCTION

The U.S. government has a paid-up license in this invention and the right in limited circumstances to require the patent owner to license others on reasonable terms as provided for by the terms of contract No. DMA 800-94-C-6008 awarded by the Office of Secretary of Defense/Defense Support Office.

BACKGROUND

This invention relates generally to ocean surveillance systems over a wide range of the electromagnetic spectrum and, more particularly, to the visible, infrared and microwave spectral regions.

The ambient ocean, as observed by a radiometer, is characterized by patterns of background radiance. The features of the background patterns which are associated with the physical structure of the ocean surface, background sky and intervening atmosphere are termed clutter. Other features are deterministic consequences of the limitations of the measurement and data recording systems, including distortions associated with the optical and imaging systems. In addition, there are features which are non-deterministic consequences of the randomness associated with the operation of the sensors and data recording systems (noise).

The radiance scene of the ambient background patterns interferes with the surveillance of "targets" which locally modulate the radiance by other mechanisms. These surveillance targets can be small or distant floating objects or patterns associated with localized hydrodynamic disturbances produced by moving surfaced or submerged vehicles.

Generally, there are two types of radiometric imaging instruments for ocean surveillance: passive radiometric imaging systems and active radiometric imaging systems. Passive radiometric imaging systems are inherently simpler and less costly than active systems such as radar or lidar. A disadvantage of existing passive systems however is their limited utility for some parts of the spectrum due to insufficient signal/clutter ratio. Further, the signal/clutter ratio is much smaller than the ratio which can be obtained from corresponding radar systems.

SUMMARY

In view of the above problems, the present invention provides a passive radiometric imaging method and system which enhance the signal/clutter ratio. The method generally comprises the steps of: (a) generating a vertically polarized image of a selected patch of the ocean surface, the vertically polarized image being defined by the radiance on a discrete array of resolution elements, also called pixels; (b) generating a horizontally polarized image of the selected patch of the ocean surface, the horizontally polarized image being defined by the radiance on the same grid, temporally and spatially registered with respect to the vertically polarized image; (c) determining a clutter reduction weighting function from the first and the second sets of radiance data; and (d) combining the first set of radiance data with the second set of radiance data utilizing the weighting function to generate a combined image with reduced wave clutter.

The present invention also provides a system for reducing clutter in images of the ocean surface, the system comprising: (a) a first polarizer for generating a vertically polarized image of a selected patch of the ocean surface, the vertically polarized image comprising a first set of radiance data; (b) a second polarizer for generating a horizontally polarized image of the selected patch of the ocean surface, the horizontally polarized image comprising a second set of radiance data; (c) a processor for computing a clutter reduction weighting function from the first and the second sets of radiance data; and (d) means for combining the first set of radiance data with the second set of radiance data utilizing the weighting function to generate a combined image with reduced wave clutter.

Preferably, the processor computes a weighting function which minimizes variance in the weighted combination of the first and the second sets of radiance data, thereby suppressing the clutter.

The present invention also provides a software system comprising program instruction for implementing the method of the present invention.

DRAWINGS

These and other features, aspects and advantages of the present invention will become understood with reference to the following description, appended claims and accompanying drawings where:

FIG. 4 illustrates the vertical polarization, horizontal polarization and weighted-sum radiance scenes according to an embodiment of the method of the present invention for a microwave radiometer at 10 GHz frequency;

FIG. 5 illustrates the vertical polarization, horizontal polarization and weighted-sum radiance scenes according to an embodiment of the method of the present invention for an infrared radiometer at 8–12 micron wavelength;

FIG. 6 illustrates the vertical polarization, horizontal polarization and weighted-sum radiance scenes according to an embodiment of the method of the present invention for a visible polarimetric camera;

FIG. 8 is a block diagram of a system for reducing clutter in images of the ocean surface according to the present invention.

DESCRIPTION

The present invention provides a method and a system for suppression of background radiance patterns in passive radiometric surveillance. Radiance images are characterized by their polarization attributes which are used to distinguish between the surveillance target and the background according to the present invention. Although in the following vertically-polarized (vpol) and horizontally-polarized (hpol) components of radiance scenes are utilized, any pair of attributes can be used instead.

There are two dominant mechanisms by which ocean waves are visualized. In the first mechanism, the reflectivity and emissivity of a resolution element of the ocean surface are modulated by wave-induced changes in the local incidence angle, defined as the angle between the line-of-sight and the normal to the tilted interface. This, in turn, modulates the radiance of the tilted resolution element even if the sky illumination is uniform. In the second mechanism, the tilt-induced movement of a patch of sky reflected into the field-of-view of the observer modulates the radiance since the radiance of the sky is generally not uniform.

Figure 1:
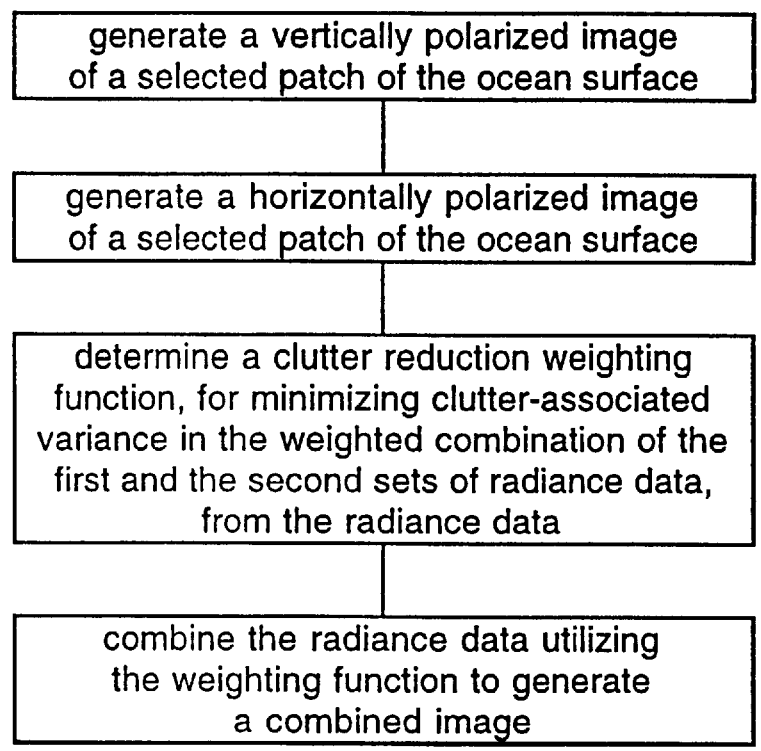
FIG. 1 is a block diagram showing the steps of an embodiment of a method of reducing clutter in passive radiometric images of the ocean according to the present invention.

An embodiment of the method in accordance with the present invention is illustrated in FIG. 1, in which measurements at two polarizations are used to suppress wind-wave clutter by: generating a vertically polarized image of a selected patch of the ocean surface, the vertically polarized image comprising a first set of radiance data; and generating a horizontally polarized image of the selected patch of the ocean surface, the horizontally polarized image comprising a second set of radiance data. The radiance data are spatially and temporally registered. The method further comprises the steps of determining a clutter reduction weighting function from the first and the second sets of radiance data; and combining the first set of radiance data with the second set of radiance data utilizing the weighting function to generate a combined image with reduced wave clutter.

The mathematical basis for the method of the present invention is described below. Each pixel in a radiance scene can be represented by a plane facet which is tilted with respect to the horizontal plane by resolved ocean waves. The tilt is characterized by a surface slope component in the incidence plane $z_y$ defined by the line-of-sight and the vertical axis, and by an orthogonal surface slope component $z_x$.

The radiance emitted from the tilted facet is the product of emissivity and surface temperature. The radiance reflected into the line-of-sight from the tilted facet is the product of sky radiance in the direction which is reflected into the line-of-sight and the reflectivity. Emissivity, reflectivity and elevation and azimuth angles of the reflected sky patch are perturbed by the tilt of the facet. Expansion of the full geometric relations between these perturbed quantities and the two surface slope components in ascending powers of $z_y$ and $z_x$ shows that the lowest order contribution to radiance perturbation is (with the exception of very near nadir) first order in $z_y$ and second order in $z_x$ (an exception being a first order contribution which is produced by the change in azimuth angle of the reflected sky patch and multiplied by the horizontal gradient of sky radiance, which is significant only when clouds are in the reflected line-of-sight). Apart from the exceptions, the major contribution to the radiance perturbation of a facet is proportional to $z_y$. Two independent measurements of radiance in which associated constants of proportionality$_{13}$ are different are used to eliminate the lowest order perturbation:

$$N(vpol)=N_0(vpol)+\propto(vpol)z_y+ \quad (1)$$

$$N(hpol)=N_0(hpol)+\propto(hpol)z_y+ \quad (2)$$

where:

N(vpol) is the vertically polarized radiance,
N(hpol) is the horizontally polarized radiance, and
$N_0$ is the flat-surface radiance.

The weighted-sum N(weighted-sum) of the two polarized radiances, is represented as follows:

$$N(\text{weighted-sum})= \quad (3)$$
$$[wN_0(vpol)+(1-w)N_0(hpol)]+[w\propto(vpol)+(1-w)\propto(hpol)]z_y+$$

When the weighting factor has a value $$w=\propto(hpol)/[\propto(hpol)-\propto(vpol)] \quad (4)$$

the lowest order perturbation due to wave tilting of the facets is eliminated.

In existing systems, it is necessary to have ground-truth information in order to evaluate the constants of proportionality from idealized theoretical modeling, i.e., the water temperature and the sky radiance and its vertical gradient at the sky elevation angle which is reflected into the line-of-sight. The method of the present invention, advantageously, obtains nominally the same optimal weighting factor but requires no additional information to that contained in the dual polarization radiance scenes. This measurement produced by two polarization components for each pixel in a scene substantially reduces the dominant contribution to clutter.

The method of the present invention is a corollary of the direct observation that when the dominant source of variance in the weighted-sum-radiance scene or subscene is wave-tilting of the facets, the variance is minimized for a particular value of the weighting factor w determined by equation 4. Under these conditions, an alternate method of determining w is to minimize the variance in the weighted-sum-radiance scene or subscene. This generates nominally the same value of w. To define this variance, all of the pixels within the scene are generally used, although this is not necessary. If the available computing throughput is not adequate, a subset that is a representative portion of the scene in physical space can be used. Any differences, which are generally small, between the two values of w are produced by higher-order contributions to the variance and by the difference between the measured mean radiance and the true flat-surface radiance, which becomes small when the number of points within the subscene is sufficiently large. Through Parsefal's theorem, this minimization can be performed either in physical space or wavenumber space.

In the embodiment of the weighted-sum radiance N(weighted-sum) defined by EQUATION (3) above, the vpol contribution is weighted by w and the hpol contribution is weighted by 1−w. However, other pairs of functions of a single parameter can also be utilized.

EMBODIMENT A

Figure 2:
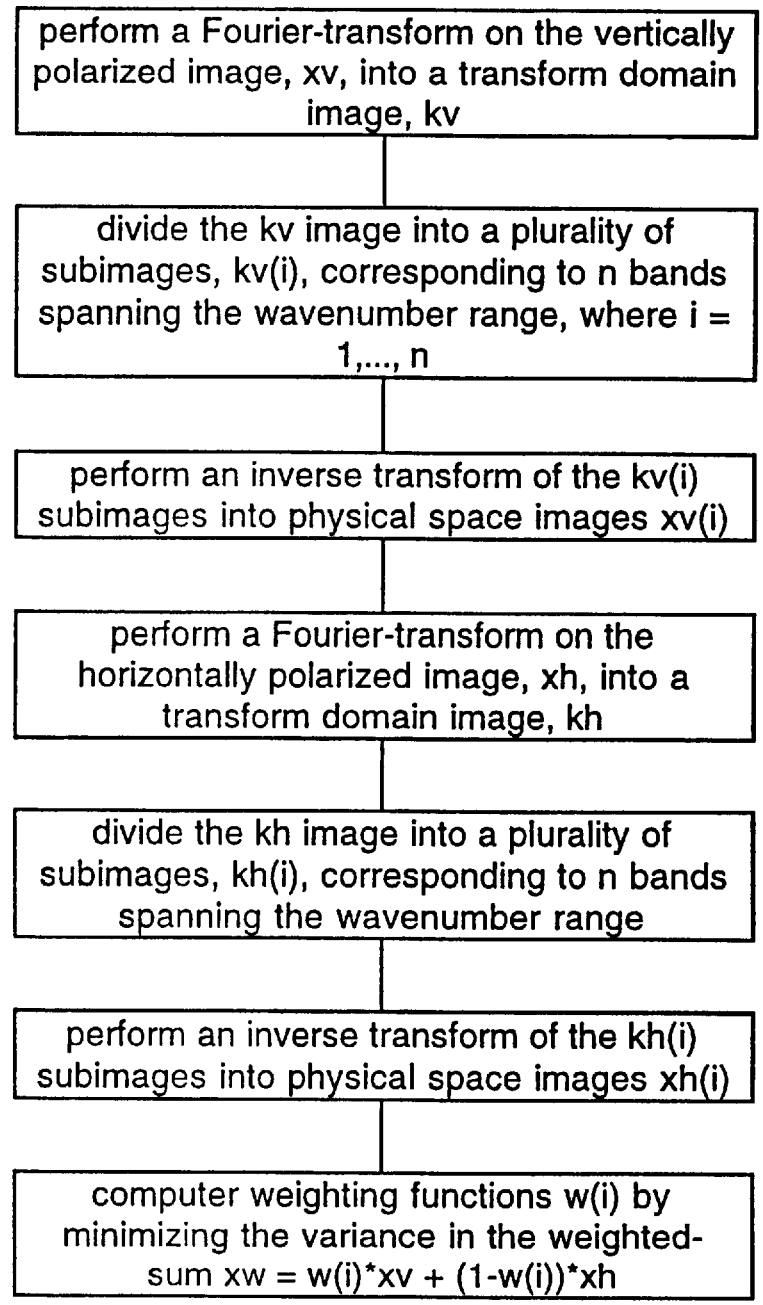
FIG. 2 is a block diagram of an embodiment of the step of computing weighting factors in physical space domain in the method of FIG. 1.
Figure 3:
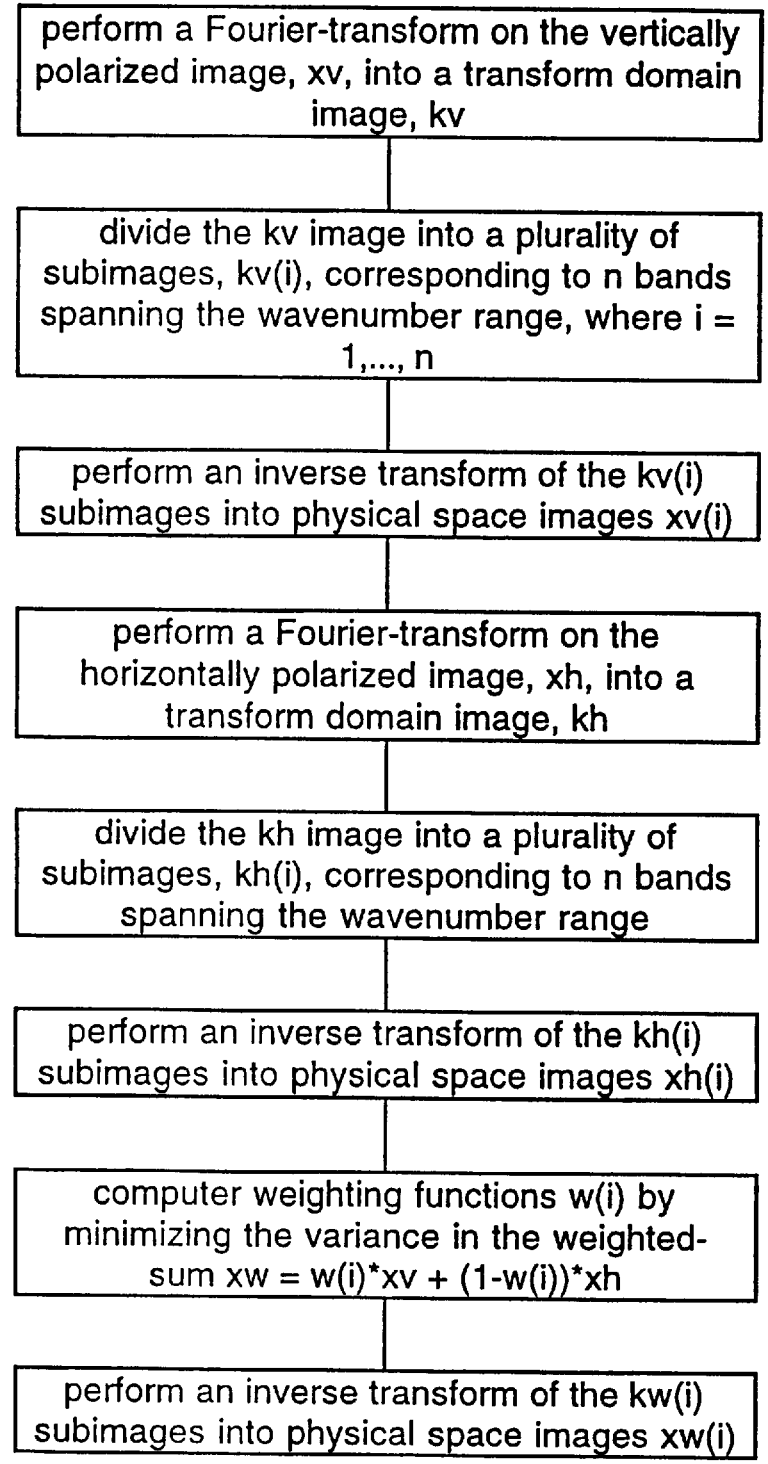
FIG. 3 is a block diagram of an embodiment of the step of computing weighting factors in fourier-transform domain in the method of FIG. 1.

FIGS. 1–3 are block diagrams showing the method steps of Embodiment A of the present invention. The step of determining a clutter reduction weighting function has two alternate embodiments, one of which is shown in FIG. 2 and the other is shown in FIG. 3. FIGS. 4a, 4b and 4c show emulated vpol, hpol and weighted-sum radiance scenes, respectively, for a 10 GHz microwave radiometer. FIGS. 5a–5c and 6a–6c show emulated vpol, hpol and weighted-sum radiance scenes for 8–12 micron infrared and visible radiometers, respectively. The following provides the detailed steps of Embodiment A represented in FIGS. 1–3.

1. Preprocessing the two vpol and hpol scenes by removing the mean and trend from each to obtain xv and xh scenes respectively;

2. Performing a Fourier-transform on the xv and xh scenes which are initially in a discretized physical space into equivalent scenes kv and kh, respectively, in the correspondingly discretized wavenumber space; and 3. Dividing each k-scene into n subscenes corresponding to n bands spanning the wavenumber range, kv(i) and kh(i) scenes, where i=1, . . . ,n. Band-pass filters can be utilized to perform the division.

After step 3, there are two alternate and functionally equivalent set of steps which lead to the same final result. One set of steps (a) performs an optimization in wavenumber space and the other (b) in physical space. The (a) set of steps after step 3 includes:

4a. Representing a weighted-sum transform scene for each subscene i as kw(i), at each pixel in kw(i), kw=w(i) *kv+(1−w(i))*kh, where w(i) is a weighting factor which can be a different constant in each wavenumber range;

5a. Computing the weighting factors w(i) by minimizing the variance in the scalar radiance transform (sum of the squares of the real and imaginary parts of the radiance transform, summed over all points in the discretized wavenumber space) in each subscene; and 6a. Performing an inverse-transform on each subscene kw(i) into the corresponding scene in physical space, xw(i).

The (b) set of steps after step3 includes:

4b. Performing an inverse-transform on the subscenes kv(i) and kh(i) to get corresponding subscenes in physical space, xv(i) and xh(i), respectively; and 5b. Representing weighted-sum scenes xw(i) in physical space. At each pixel in xw, the radiance is given by:

$$xw=w(i)*xv+(1-w(i))*xh \qquad (5)$$

where the weighting factors w(i) can be different constants for each wavenumber range; and 6b. Computing the weighting factors w(i) by minimizing the variance in the weighted-sum radiance xw.

Following the path of optimization either in wave number space (a) or in physical space (b), the process proceeds along a concluding path as follows:

7. Examining the subscenes xw(i) separately for the presence of targets, or summing the subscene radiances xw(i) pixel-by-pixel to get a broadband clutter-reduced scene, xw.

EMBODIMENT B

Another embodiment of the method of the present invention makes a summation of the transformed radiance contributions in the wavenumber bands kw(i) pixel-by-pixel to get the transformed broadband scene kw in place of performing an inverse transform on each subscene kw(i) into the corresponding scene in physical space. The broadband kw scene is then inverse-transformed to get the broadband scene in physical space, xw. The xw scene can then be examined for the presence of targets. This has the advantage of requiring only one inverse transform instead of n inverse transforms. The trade-off is the loss of opportunity to examine the subscenes xw(i) separately for the presence of targets.

EMBODIMENT C

In yet another embodiment of the method of the present invention only one wavenumber range, n=1, can be utilized. This obviates the requirement to perform Fourier transforms and once the processing of the vpol and hpol scenes is accomplished by removing the mean and trend from each of the xv and xh scenes, the weighted-sum radiance for each pixel defined by xw=w(i)* xv+(1−w(i)*xh (5). The weighting factor w is then evaluated by minimizing the variance in xw, using a representative subset of the data.

EMBODIMENT D

In a further alternative embodiment, the scenes can be divided into subscenes in physical space and a different weighting factor evaluated in each subscene. This is advantageous when the incidence-angle range within a scene is large, as the optimal value of the weighting factor depends on incidence angle.

EMBODIMENT E

Another option after evaluating the weighting factor in each subscene, a smooth curve can be fit to the weighting factor values as a function of the corresponding incidence angle descriptor (average incidence angle or average distance from the nadir track for each subscene), and the smoothed value can be used to define the radiance. This is advantageous when the data are noisy (i.e., when a substantial proportion of the variance is due to noise as opposed to clutter).

EXAMPLE

In the following example, an emulation model utilizes a realization of the wavy ocean surface and a mathematically modeled instrument to generate the required pair of polarized scenes and emulates the clutter-reduction performance of an embodiment of the method of the present invention.

A realization of the ocean surface is generated which satisfies measured equilibrium elevation spectra for specified wind speed and direction. The geometry associated with specified platform elevation, pointing direction of the optical axis, and angular position of the pixels relative to the optical axis is used to distribute the centers of the pixels on this surface. The resolved slope components then define the facet orientation associated with each pixel. Exact geometric relations determine the incidence angle, and the angular coordinates of the sky point reflected into the line of sight perturbed from the flat surface values by the tilt of the facet. The sky radiance is evaluated from published models based on measurements in each of the spectral ranges. The emissivity and reflectivity are related through the Fresnel relations to the incidence angle. The radiance can then be computed for each pixel, given the radiometer frequency and polarization and certain environmental properties which are needed to evaluate the Fresnel relations (water temperature) and sky radiance (atmospheric temperature and moisture content).

FIGS. 4*a*, 4*b* and 4*c* show emulated vpol, hpol and weighted-sum radiance scenes for a 10 GHz microwave radiometer. FIGS. 5*a*–5*c* and 6*a*–6*c* show emulated vpol, hpol and weighted-sum radiance scenes for 8–12 micron infrared and visible spectrum radiometers, respectively. Where like scenes are discussed in the Figures they will be identified with like numerals. The particular conditions for the scenes are: wind speed 10 m/s and is directed normal to the platform path represented by arrow 16. The instrument is operated in strip-map-mode, wherein the observed spot is scanned sequentially from the near edge of the scene to the far edge along a normal to the platform path 16, then snapped back to the near edge of the scene for the next column of pixels in the scene, with the platform motion providing the spacing between columns. The angular spacing between rows of pixels is constant, so the pixels in the ground-plane become elongated with increasing incidence angle. The nominal pixel diameter at nadir is 10 m in all three emulations.

The method of Embodiment D of the present invention described above is utilized, with each row of pixels (corresponding to a sample in which all points have the same incidence angle) considered to be a subscene. The weighting factor w is therefore different on each row of pixels.

Referring to FIGS. 4a–4c, radiance at a 10 GHz microwave frequency is represented by the equivalent brightness temperature relative to the mean on a row of pixels. The vpol and hpol scenes in FIGS. 4a and 4b contain a wake-like "target" 18 which has a peak-to-peak amplitude of 0.05 degrees K, but cannot be seen because the corresponding peak-to-peak amplitude of the wind-wave clutter represented by the arrow 20 is 9.5 and 5.7 degrees K, respectively. The weighted-sum scene in FIG. 4c is the optimally-weighted-sum of vpol and hpol scenes. The peak-to-peak clutter amplitude represented by arrow 20 is reduced to 0.08 degrees K and the "target" 18 is now clearly discernible.

FIGS. 5a, 5b and 5c represent the vertical polarization, the horizontal polarization and the weighted-sum radiance, respectively, in the 8–12 micron infrared band. The same brightness-temperature scale (0.2 degrees peak-to-peak) is used in the vpol, hpol and weighted-sum scenes in FIGS. 5a–5c. The substantial clutter reduction obtained using the method of the present invention can be observed by comparing weighted-sum scene in FIG. 5c with either vpol or hpol scenes in FIG. 5a or 5b. It should be pointed out there is no target in these scenes.

In FIGS. 6a–6c, the emitted radiance at visible wavelengths is negligible and the sky temperature distribution is dependent on the sun elevation and on the position relative to the sun of the sky spot which is reflected into the line-of-sight. The degree of haziness as measured by the opacity of the atmosphere is an environmental property which characterizes the sky radiance. In this example, the sky is clear, the sun azimuth is at 315 degrees with respect to the platform heading, and the sun zenith angle is 30 degrees. FIG. 6a represents the vpol scene, 6b represents the hpol scene and 6c represents the weighted-sum scene. The direction of platform motion is represented by an arrow 46. The radiance is presented in a different form in FIGS. 6a–6c: the radiance relative to the mean along each row of pixels is normalized by the corresponding standard deviation (RMS) of radiance along that row. A "target" 48 consisting of a wake-like pattern with a peak-to-peak modulation of 20% of the local radiance is present in the vpol and hpol scenes, and becomes substantially more discernable in the weighted-sum scene in FIG. 6c.

As shown in FIGS. 4a–4c, 5a–5c and 6a–6c, the method of the present invention is highly effective in reducing the level of clutter from that in the measured vpol and hpol scenes. When the generic "targets" of interest are visualized as a result of phenomena other than that of tilting of the corresponding pixels, as is the case for floating objects and for localized hydrodynamic disturbances, the change in signal amplitude associated with the weighted-sum of vpol and hpol radiances can be expected to be nominal compared with the decrease in clutter level. The signal-to-clutter ratio can therefore be expected to increase substantially.

Figure 7A:
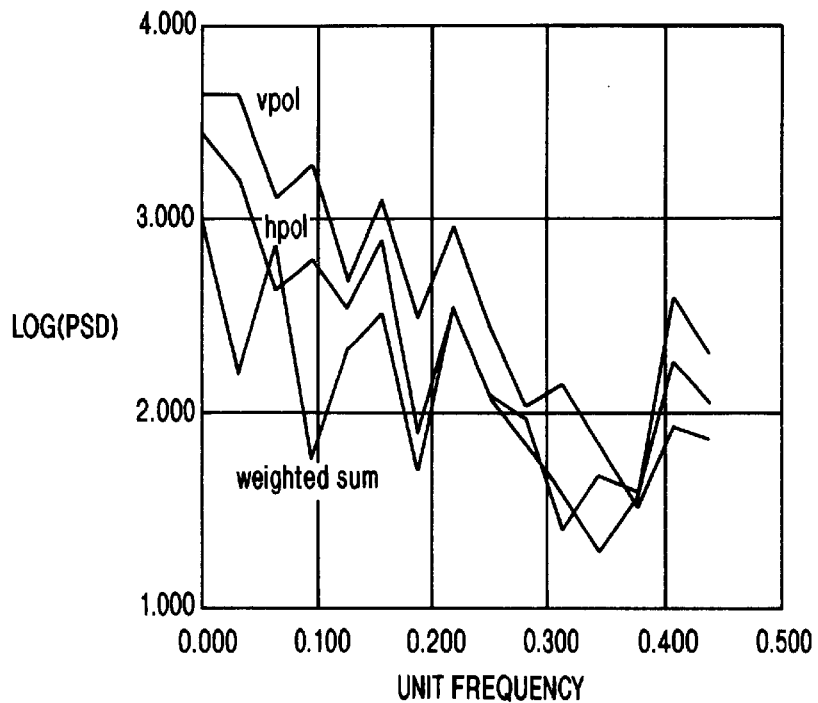
FIG. 7a illustrates the power spectra for 1-d 2×2 pixel-averaged ocean measurements of vertical polarization and horizontal polarization radiance in the 4.6–4.9 micron infrared band and demonstrates the clutter reduction obtained by the corresponding optimal weighted-sum radiance according to an embodiment of the method of the present invention.
Figure 7B:
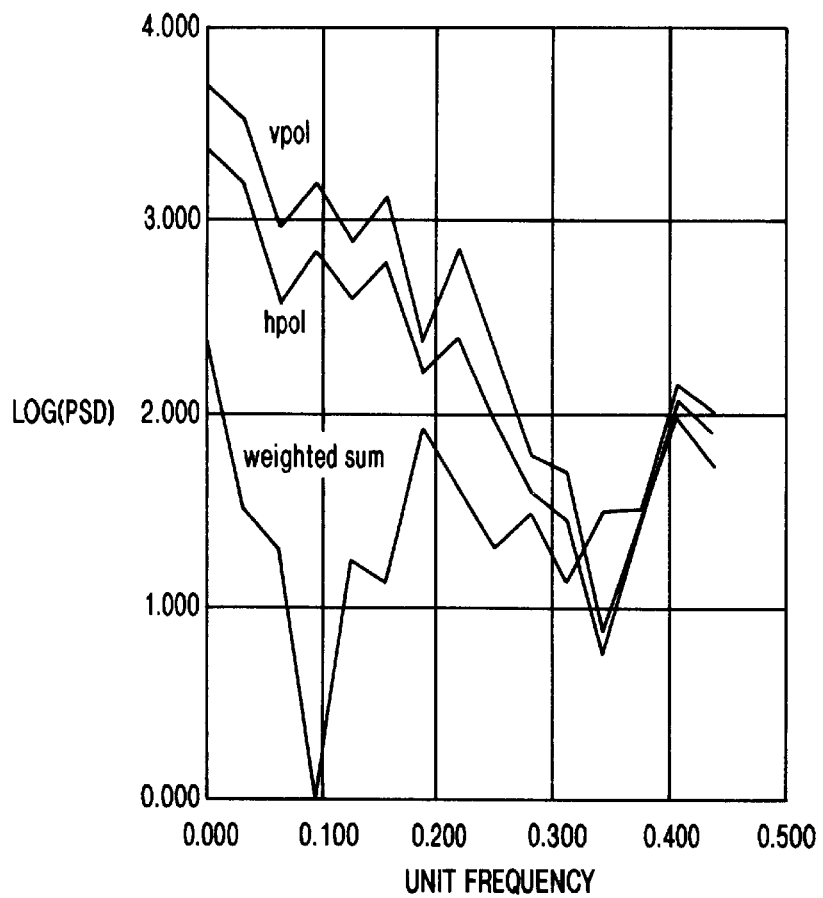
FIG. 7b illustrates the power spectra for 1-d 10×10 pixel-averaged ocean measurements of vertical polarization and horizontal polarization radiance in the 4.6–4.9 micron infrared band and demonstrates the clutter reduction obtained by the corresponding optimal weighted-sum radiance according to an embodiment of the method of the present invention.

FIGS. 7a–7b show plots of the log of the power spectral density (PSD) vs. unit frequency. The results were obtained from application of Embodiment A to the infrared ocean clutter data obtained from Environmental Research Institute of Michigan and described in the Report No. 253870-2-F, "Mid-wave Infrared Imaging Polarimeter: ,Instrument Development and Background Measurements" by T. J. Rogne, K. W. Gleichman and J. R. Maxwell (March 1995). The data illustrates a sequence of vpol and hpol 40×40 pixel scenes at uniform (½ second) time intervals taken from an aircraft platform. The nominal incidence angle was held constant at a reported 60 degrees, and the platform motion and scene footprint at the ocean surface resulted in a shift of 12 pixels in the direction of platform motion between adjacent scenes.

The sequence of scenes is considered as a single row in a strip-map-mode measurement, with each scene treated as if it were a single pixel with appropriate averaging of points. For such pixels with up to 12×12 averaged points nominally located at the center of each scene, there is no overlap of adjacent pixels provided that the direction of the instrument line-of-sight with respect to the platform and the platform velocity vector remain unchanged.

Embodiment A of the method of the present invention was applied to 32-scene segments of the data using n=2, which represents two wavenumber bins each containing an equal number of wavenumber intervals. The power spectra for the vpol, hpol and weighted-sum 1-d scenes were computed for each segment and averaged over eight such data segments with an overlap of roughly 50% to obtain smoothed spectral estimates. The spectra are normalized so that the sum of the PSD over the 16 points of the discrete spectrum multiplied by the "unit frequency" interval ($1/32$) is the variance of the radiance. With this normalization, the unit frequency at point j in the spectrum is (j−1)/32. The corresponding spatial or temporal spectra can be obtained by an appropriate renormalization.

FIGS. 7a and 7b compare the spectra (log (PSD) vs unit frequency) from the vpol, hpol and weighted-sum 1-d scenes. In FIG. 7a, each pixel represents a 2×2 point average from the center of a 40×40 2-d scene. The high wavenumber bin is dominated by noise and the optimization therefore has only a nominal effect. The performance is limited by the low-wavenumber artifacts produced by aliasing from the high-wavenumber bin.

In FIG. 7b, each pixel represents a corresponding 10×10 point average. The noise level is reduced due to increased averaging and thereby reduces the PSD for the vpol and hpol 1-d scenes and at the same time makes the optimization more effective in the weighted-sum scene. The optimization in the low-wavenumber bin is substantially more effective. The increased averaging in FIG. 7b reduces the high-wavenumber noise content and the associated aliased power in the low-wavenumber bin. The reduction in clutter in 7b is substantial, even near the noise threshold.

The present invention also provides a system 10 for reducing clutter in images of the ocean surface. Referring to FIG. 8, the system 10 comprises: (a) a first polarizer 12 for generating a vertically polarized image of a selected patch of the ocean surface, the vertically polarized image including a first set of radiance data; (b) a second polarizer 14 for generating a horizontally polarized image of the selected patch of the ocean surface, the horizontally polarized image including a second set of radiance data; (c) a processor 16 for computing a clutter reduction weighting function from the first and the second sets of radiance data; and (d) means 18 for combining the first set of radiance data with the second set of radiance data utilizing the weighting function to generate a combined image with reduced wave clutter.

Figure 9:
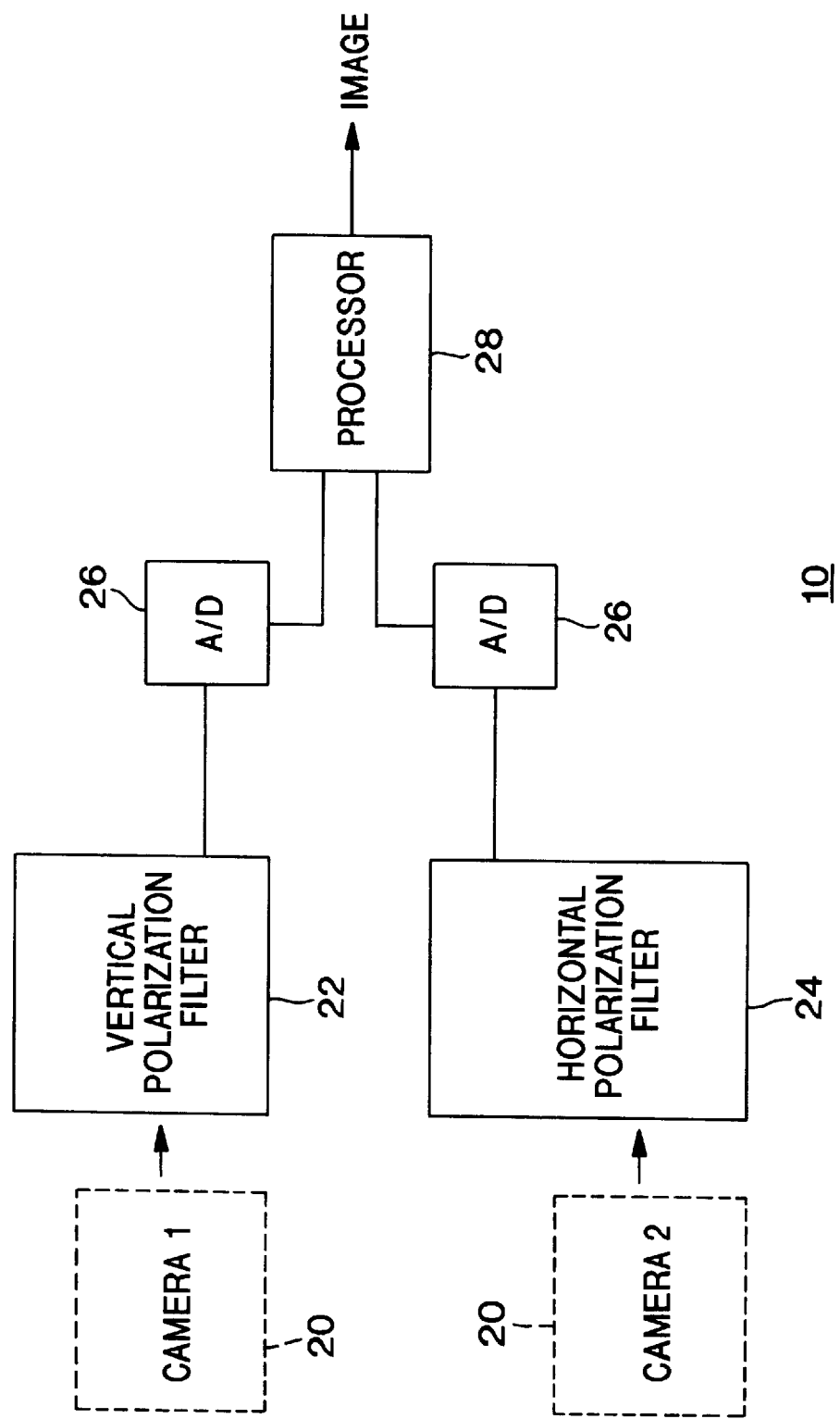
FIG. 9 is a diagram of an embodiment of the system of FIG. 8.

As shown in FIG. 9, in one embodiment of the system 10 of the present invention, cameras 20, such as charge-coupled devices (CCD), are utilized to generate two images of a scene. A vertical polarization filter 22 and a horizontal polarization filter 24 are utilized to generate a horizontally polarized image and a vertically polarized image, respectively. The CCD devices and the polarizes can be the front end of a two-CCD video camera with polarizing filters.

Analog-to-digital (A/D) converters 26 are utilized to convert the image arrays to corresponding digital vpol and hpol arrays frame by frame. The digitized arrays are stored in a memory device for further processing. A processor 28 such as a general purpose computer or a dedicated microprocessor are programmed to compute the weighting function w described above. The processor 28 can include a central processing unit, memory, communication ports, magnetic or optical storage all interconnected via a bus.

The processor 28 is further programmed to combine the digital arrays xv and xh as described above to obtain the weighted-sum xw. A display is utilized to display the weighted-sum xw or a variant thereof. Programming of the processor 28 includes programming the processor with a set of computer instructions to perform the steps necessary to compute aforementioned relations.

The present invention further provides a software system for implementing the method of the present invention to be performed by a general purpose or dedicated computer system. Examples of suitable programming languages include C, Pascal, assembly language, etc. Further, simulation, modeling and mathematical software packages can be used to implement the steps of the method of the present invention.

In one embodiment, the software system of the present invention comprises program instructions for:

(a) generating, from measurements of a selected patch of the ocean, two images having the following properties:
 i. an image is defined as a discrete array of pixels, each characterized by a value of radiance;
 ii. the two images are registered pixel-by-pixel in both space and time;
 iii. the two images have different polarization attributes (one vertically-polarized (vpol), the other horizontally-polarized (hpol)) and the corresponding radiances are designated as $N_v$ and $N_h$, respectively;

(b) defining the corresponding images in wavenumber space by performing a discrete Fourier transform of each image, the corresponding transformed radiances being $N_v$ and $N_h$;

(c) dividing the image pairs into subimage pairs, with subimages defined as follows:
 i. divide the wavenumber space into a discrete number (n) of partitions;
 ii. use band-pass filters to define the ith subimage as excluding energy outside of the ith partition (except for the effect of filter smoothing at partition boundaries);

(d) performing the inverse transform to obtain the subimage pairs in physical space;

(e) creating a third subimage for each of the n partitions, in which the radiance transform $N_w$ at each pixel is a weighted-sum of $N_v$ and $N_h$, the weighted-sum being defined as follows:
 i. $N_w = f(W)N_v + g(w)N_h$;
 ii. the weighting factors f and g are functions of a single scalar constant w;
 iii. for the examples presented here, $f=w$ and $g=1-w$ and correspondingly, in physical space, the subimage radiance for each of the n subimages is defined as:
 iv. $N_w = f(w)N_v + g(w)N_h$;
 v. a different value of the weighting constant w is defined for each of the n partitions;

(f) evaluating an optimal value of w for each of the n partitions. This is done in one of two alternate ways:
 i. for each subimage, write an expression for the variance of $N_w$ over all points in physical space, minimize that variance with respect to the value of w, and solve the resulting equation explicitly for w.
 ii. for each subimage, write an expression for the variance of the scalar radiance transform $N_w$ over all points in wavenumber space which contain energy in that partition, minimize that variance with respect to the value of w, and solve the resulting equation explicitly for w; The alternate means of evaluating the weighting constant in each subimage are equivalent, as a consequence of Parsefal's theorem.

The reduction in clutter can be observed in each of the band-pass-filtered subimages compared with the corresponding band-pass-filtered vpol and hpol images. Alternatively, the subimage radiances can be summed to generate the corresponding broad-band radiance. The reduction in clutter can also be observed in the optimized broad-band image compared with the corresponding original measured vpol and hpol images.

Other embodiments of the software system implementing the method of the present invention include simplifications to the method of the present invention as follows:

(a) If viewing the broadband clutter-reduced image is all that is desired (i.e., if the band-pass-filtered subimages are not generated), the optimization can be done in wavenumber space, the subimages summed to give the transform of the broad-band image, and only a single inverse transform is then required;

(b) when n=1, no Fourier transforms are required since the optimization can be performed in physical space; or (c) the physical space can be partitioned and Embodiment A of the method of the present invention or steps (a) and (b) can be applied within each of the physical subdomains.

(d) The method of the present invention includes the steps of computing the weighting function w. The computational steps can be performed by a software program executed by a general purpose computer. The following is an example of a subroutine written in FORTRAN that evaluates the weighting function w in Fourier or wavenumber space, divided into M wavenumber ranges (1<M<i):

```
      SUBROUTINE DATASUM(DATA1, DATA2, DATA9, Wk, N)
C     GIVEN REAL ARRAYS DATA1(I), DATA2(I), I=1, N WHERE N IS 2**M,
INTEGER EM
C     THIS SUBROUTINE:
C         TAPERS DATA WITH PARZEN WINDOW
C         FINDS (COMPLEX) FFTS FFT1(I), FFT2(I), I=1, N
C         FINDS WEIGHTING FACTOR ARRAY W(I) SUCH THAT:
```

```
C            REAL (FFT3(I)) **2+IMAG (FFT3(I)) **2 IS MINIMIZED, WHERE
C            FFT3(I) =W(I) *FFT1(I)+(1.-W(I)) *FFT2 (I)
C            INVERSE TRANSFORMS FFT3(I) TO GET WINDOWED OUTPUT, DATA3(I)
C            REMOVES THE WINDOW FUNCTION
             DIMENSION DATA1(N), DATA2(N), data3(32), wk(32), wx(32), data4(32)
             dimension data5(32), data6(32), data7(32), data8(32), data9(32)
C      LOCAL ARRAY, WINDOW FUNCTION WIN
             DIMENSION WIN(128)
C      LOCAL ARRAYS, FFTS OF DATA1, DATA2, DATA3
             COMPLEX FFT1(256), FFT2(256), FFT3(256), fft4(256)
             dimension d1(256), d2(256)
C      DEFINE PARAZEN WINDOW FUNCTION
             WINDOW(I)=1.-ABS(((I-1)-FACM) *FACP)
             N2=N/2
             FACM=N2-0.5
             FACP=1./(N2+0.5)
c      demean
             call detrend(data1, data7, 32)
             call detrend(data2, data8, 32)
C      APPLY WINDOW, SAVE FOR REMOVING WINDOW
             DO 10 I=1, N
             WIN(I)=WINDOW(I)
             D1(I)=DATA7(I) *WIN(I)
             D2(I)=DATA8(I) *WIN(I)
             data3(i)=0.
             fft4(i)=0.
10           CONTINUE
C      TRANSFORM THE DATA
             CALL TWOFFT(D1, D2, FFT1, FFT2, N)
C      FIND THE WEIGHTING FACTOR ARRAY W(I)
C      AND THE OUTPUT DATA ARRAY TRANSFORM FFT3/N
C            DIVIDE THE FFTS INTO m GROUPS AND FIND AN OPTIMUM W FOR EACH
GROUP
             m=2
             kk=n2/m
             DO 20 j=1,m
             num=0.
             den=0.
             k0=kk* (j-i)+1
             do 15 k=2,n2
c      This skips the point k=n2+1 in the spectrum, but so does the
spectral
c      estimator SPCTRM. Also skips k=1 (mean) because mean will be
removed
c      anyway.
             Bandpass filter functions
             scale=2.
             if (j.eq.1) then
                 ph=(1.-tanh((k-kk-k0)/scale))/2.
                 else if (j.eq.m) then
                 ph=(tanh((k-k0)/scale)+1.)/2.
                 else
                 ph=(tanh((k-k0)/scale)-tanh((k-kk-k0))scale))/2.
                 endif
             VR=REAL(FFT1(k)) *ph
             VI=AIMAG (FFT1(k)) *ph
             HR=REAL (FFT2(k)) *ph
             HI=AIMAG (FFT2(k)) *ph
             DIFR=VR-HR
             DIFI=VI-HI
             num=num+hr*difr+hi*difi
15           den=den+difr**2+difi**2
             wj=-num/den
             wk(j)=wj
             do 180 L=0,1
             do 16 k=1, n2+1
             if (j.eq.1) then
                 ph=(1.-tanh((k-kk-k0)/scale))/2.
                 else if (j.eq.m) then
                 ph=(tanh((k-k0)/scale)+1.)/2.
                 else
                 ph=(tanh((k-k0)/scale)-tanh((k-kk-k0)/scale))/2.
                 endif
16           FFT3(k)=(FFT1(k) *L+FFT2(k)*(1.-L)) *ph/n
             do 17 I=2, n2
             ii=n+2-i
17           fft3(ii)=conjg(fft3(i))
C      NVERSE TRANSFORM AND REMOVE WINDOW
             CALL FOUR1(FFT3, n, -1)
             DO 18 I=1, N
```

-continued

```
                temp=real (fft3 (i))/win(i)
                if(L.eq.1)then
c       vpol
                DATA5(I)=temp
                else
c       hpol
                data6(i)=temp
                endif
18          continue
180         continue
c       find weight factor
                avv=0.
                avh=0.
                vv=0.
                hh=0.
                vh=0.
                do 200 I=1,n
                avv=avv+data5(i)
200         avh=avh+data6(i)
                avv=avv/n
                avh=avh/n
                do 201 I=1,n
                vv=vv+(data5(i)-avv)**2
                hh=hh+(data6(i)-avh)**2
201         vh=vh+(data5(i)-avv)*(data6(i)-avh)
                wx(j)=(hh-vh)/(vv-2.*vh+hh)
                varv=sqrt(vv/n)
                varh=sqrt(hh/n)
                av=wx(j)*avv+(1.-wx(j))*avh
                var=0
                dimension bindx(32), y(32, 6)
                do 19 I=1, n
                bindx(i)=i
c       weighted sum
                data4(i)=wx(j)*(data5(i))+(1.-wx(j))*(data6(i)
                var=var+(data4(i)-av)**2
                data3(i)=data3(i)+data4(i)
                continue
                var=sqrt (var/n)
                print *,' j, wk, wx, rmsv, rmsh, rms: ', j, wk (j), wx (j), varv,
varh, var
                pause
                character*9 name
                name='spectrum '
                do 160 k=1, n2+1
                if(j.eq.1)then
                    ph=(1.-tanh((k-kk-k0)/scale))/2.
                    else if(j.eq.m)then
                    ph=(tanh((k-k0)/scale)+1.)/2.
                    else
                    ph=(tanh((k-k0)/scale)-tanh((k-kk-k0)/scale))/2.
                    endif
160         FFT4(k)=fft4(k)+(FFT1(k)*wk(j)+FFT2(k)*(1.-wk(j)))*ph/n
20          continue
                do 170 I=2, n2
                ii=n+2-i
170         fft4(ii)=conjg(fft4(i))
C       INVERSE TRANSFORM AND REMOVE WINDOW
                CALL FOUR1 (FFT4, n, -1)
                DO 190 I=1, N
                data9(i)=real(fft4(i))/win(i)
190         continue
                avv=0.
                avh=0.
                av=0.
                avk=0.
                do 25 I=1, n
                avv=avv+data1(i)
                avh=avh+data2(i)
                av=av+data3(i)
                avk=avk+data9(i)
                y (i, 1)=data3(i)+25.
                y (i, 2)=data9(i)
                y (i, 3)=data7(i)+50.
                y (i, 4)=data8(i)+75.
25          continue
                call draw3(bindx, y(1, 1), bindx, 32, 4, 0, name)
                avv=avv/n
                avh=avh/n
                av=av/n
```

```
            avk=avk/n
            varv=0.
            varh=0.
            var=0.
            vark=0.
            do 30 I=1, n
            varv=varv+(data1(i)-avv) **2
            varh=varh+(data2(i)-avh) **2
            var=var+(data3(i)-av) **2
            vark=vark+(data9(i)-avk) **2
30          continue
            varv=sqrt (varv/n)
            varh=sqrt (varh/n)
            var=sqrt (var/n)
            vark=sqrt (vark/n)
            print *,' rmsv, rmsh, rms, rmsk: ', varv, varh, var, vark
            pause
            RETURN
```

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of reducing clutter in passive radiometric images of the ocean surface, the method comprising the steps of:
   a. generating a vertically polarized image of a selected patch of the ocean surface, the vertically polarized image comprising a first set of radiance data;
   b. generating a horizontally polarized image of the selected patch of the ocean surface, the horizontally polarized image comprising a second set of radiance data;
   c. determining a clutter reduction weighting factor from the first and the second sets of radiance data;
      i. performing a Fourier-transform on the vertically polarized image, xv, into a transform domain image, kv;
      ii. dividing the kv image into a plurality of subimages, kv(i), corresponding to n bands spanning the wavenumber range, where i=1 . . . n;
      iii. performing an inverse transform of the kv(i) subimages into physical space images xv(i);
      iv. performing a Fourier-transform on the horizontally polarized image, xh, into a transform domain image, kh;
      v. dividing the kh image into a plurality of subimages, kh(i), corresponding to the n bands spanning the wavenumber range;
      vi. performing an inverse transform of the kh(i)subimages; into physical images xh(i); and
      (vii) computing weighting factors w(i) by minimizing the variance in the weighted-sums xw: where $xw(i)=w(i)*xv+*xh(i)$; and (d) combination in the first set of radiance data with the second set of radiance data utilizing the weighting factor to generate combined image written reduced wave clutter.

2. The method of claim 1 further including the steps of fitting a smooth curve to the weighting factor as a function of corresponding incidence angle descriptor to define radiance values, after evaluating the weighting factor for each subimage.

3. A method of reducing clutter in images of the ocean surface, the method comprising the steps of:
   (a) generating a vertically polarized image, xv, of a selected patch of the ocean surface, the vertically polarized image including a first set of radiance data;
   (b) generating a horizontally polarized image, xh, of the selected patch of the ocean surface, the horizontally polarized image including a second set of radiance data;
   (c) determining a clutter reduction weighting factor by:
      (1) performing a Fourier-transform on the vertically polarized image, xv, into a transform domain image, kv;
      (2) dividing the kv image into a plurality of subimages, kv(i), corresponding to n bands spanning the wavenumber range, where i=1, . . . , n;
      (3) performing an inverse transform of the kv(i) subimages into physical space images xv(i);
      (4) performing a Fourier-transform on the horizontally polarized image, xh, into a transform domain image, kh;
      (5) dividing the kh image into a plurality of subimages, kh(i), corresponding to the n bands spanning the wavenumber range;
      (6) performing an inverse transform of the kh(i) subimages into physical space images xh(i); and
      (7) computing weighting factors w(i) by minimizing the variance the in the weighted-sum xw,
      where $xw(i)=w(i)*xv(i)+(1-w(i))*xh(i)$; and
   (d) combining the first set of radiance data with the second set of radiance data to generate a combined image with reduced wave clutter by computing the expression:

$xw(i)=w(i)*xv(i)+(1-w(i))*xh(i)$, for $i=1, \ldots, n$

Where xw is the weighted combination image.

4. A method of reducing clutter in images of the ocean surface, the method comprising the steps of:
   (a) generating a vertically polarized image, xv, of a selected patch of the ocean surface, the vertically polarized image including a first set of radiance data;
   (b) generating a horizontally polarized image, xh, of the selected patch of the ocean surface, the horizontally polarized image including a second set of radiance data;
   (c) determining a clutter reduction weighting factor by:
      (1) performing a Fourier-transform on the vertically polarized image, xv, into a transform domain image, kv;

(2) dividing the kv image into a plurality of subimages, kv(i), corresponding to n bands spanning the wavenumber range, where i=1, ..., n;

(3) performing an inverse transform of the kv(i) subimages into physical space images xv(i);

(4) performing a Fourier-transform on the horizontally polarized image, xh, into a transform domain image, kh;

(5) dividing the kh image into a plurality of subimages, kh(i), corresponding to the n bands spanning the wavenumber range;

(6) computing weighting factors w(i) by minimizing the variance the in the weighted-sum kw, where kw(i)=w(i)*kv(i)+(1−w(i))*kh(i); and (7) performing an inverse transform of the kw(i) subimages into physical space images xw(i); and (d) combining the first set of radiance data with the second set of radiance data to generate a combined image with reduced wave clutter by computing the expression:

$$xw(i)=w(i)*xv(i)+(1-w(i))*xh(i), \text{ for } i=1,\ldots,n$$

Where xw is the weighted combination image.

5. A system for reducing clutter in passive radiometric images of the ocean surface, the system comprising:

(a) a first polarizer for generating a vertically polarized image of a selected patch of the ocean surface, the vertically polarized image including a first set of radiance data;

(b) a second polarizer for generating a horizontally polarized image of the selected patch of the ocean surface, the horizontally polarized image including a second set of radiance data;

(c) a processor for computing a clutter reduction weighting factor from the first and the second sets of radiance data; said processor programmed to perform the following functions:

(i) a Fourier-transform on the vertically polarized image, xv, into a transform domain image, kv;

(ii) dividing the kv image into a plurality of subimages, kv(i), corresponding to the n bands spanning the wavenumber range, where i=1 ... n;

(iii) performing an inverse transform of the kv(i) subimages into physical space images xv(i);

(iv) performing a Fourier-transform on the horizontally polarized image, xh, into a transform domain image, kh;

(v) dividing the kh image into a plurality of subimages, kh(i), corresponding to the n bands spanning the wavenumber range;

(vi) performing an inverse transform of the kh(i) subimages into physical space images xh(i); and (vii) computing weighting functions w(i) by minimizing the variance in the weighted-sum xw:
where xw(i)=w(i)*xv(i)+(1−w(i))*xh (i) and (d) means for combining the first set of radiance data with the second set of radiance data wherein the means for combining computes the expression:

$$N_{hv}=W_v N_v+(1-W_v)N_h$$

$N_{hv}$ is radiance measurement of the patch of ocean surface with vertical polarization;

$N_h$ is radiance measurement of a patch of ocean surface with horizontal polarization;

$W_v$ is the weighting factors; and $N_{hv}$ is the weighted combination image.

6. The system of claim 5, wherein the processor includes means for computing a weighting factor for minimizing clutter-associated variance in the weighted combination of the first and the second sets of radiance data.

7. The system of claim 6 wherein the means for computing a weighting factor computes a least squares minimization of the clutter-associated variance.

8. A system for reducing clutter in passive radiometric images of the ocean surface, the system comprising:

(a) a first polarizer for generating a vertically polarized image of a selected patch of the ocean surface, the vertically polarized image including a first set of radiance data;

(b) a second polarizer for generating a horizontally polarized image of the selected patch of the ocean surface, the horizontally polarized image including a second set of radiance data;

(c) a processor for computing a clutter reduction weighting factor from the first and the second sets of radiance data, wherein the processor is programmed to perform the steps of:

(1) performing a Fourier-transform on the vertically polarized image, xv, into a transform domain image, kv;

(2) dividing the kv image into a plurality of subimages, kv(i), corresponding to n bands spanning the wavenumber range, where i=1, ..., n;

(3) performing an inverse transform of the kv(i) subimages into physical space images xv(i);

(4) performing a Fourier-transform on the horizontally polarized image, xh, into a transform domain image, kh;

(5) dividing the kh image into a plurality of subimages, kh(i), corresponding to the n bands spanning the wavenumber range;

(6) performing an inverse transform of the kh(i) subimages into physical space images xh(i); and (7) computing weighting factors w(i) by minimizing the variance in the weighted-sum xw, where xw(i)=w(i)*xv(i)+(1−w(i))*xh(i); and (d) means for combining the first set of radiance data with the second set of radiance data utilizing the weighting factor to generate a combined image with reduced wave clutter, wherein the means for combining computes the expression:

$$xw(i)=w(i)*xv(i)+(1-w(i))*xh(i), \text{ for } i=1,\ldots,n$$

Where xw is the weighted combination image.

9. A software system for reducing clutter in passive radiometric images of the ocean surface, the software system comprising program instruction for:

(a) generating a vertically polarized image of a selected patch of the ocean surface, the vertically polarized image including a first set of radiance data;

(b) generating a horizontally polarized image of the selected path of the ocean surface, the horizontally polarized image including a second set of radiance data;

(c) computing a clutter reduction weighting factor from the first and the second sets of radiance data by:

(i) performing a Fourier-transform on the vertically polarized image, xv, into a transform domain image, kv;

(ii) dividing the kv image into a plurality of subimages, kv(i), corresponding to n bands spanning the wavenumber range, where i−1, ..., n;

(iii) performing an inverse transform of the kv(i) subimages into physical space images xv(i);
(iv) performing a Fourier-transform on the horizontally polarized image, xh, into a transform domain image, kh, which has n wavenumbers;
(v) dividing the kh image into a plurality of subimages, kh(i), corresponding to the n bands spanning the wavenumber range;
(vi) performing an inverse transform of the subimages:
 (1) kh(i) into physical space images xh(i);
 (2) kw(i) into physical space images xw(i);
(vii) computing weighting factors w(i) by minimizing the variance in the weighted-sums xw and kw where:

$$xw(i)=w(i)*xv(i)+(1-w(i))*xh(i).$$
$$kw(i)=(i)*kn+(1-kwg)]*khi.$$

(d) combining the first and second sets of radiance data by computing the expression:

$$N_{hv}=W_vN_v+(1-W_v)N_h$$

wherein:
 $N_v$ is radiance measurement of the patch of ocean surface with vertical polarization;
 $N_h$ is radiance measurement of a patch of ocean surface with horizontal polarization;
 $W_v$ is the weighting factors; and
 $N_{hv}$ is the weighted combination image.

10. The software system of claim 9, wherein the program instruction for performing step (c) include program instructions for computing a weighting factor for minimizing clutter-associated variance in the weighted combination of the first and the second sets of radiance data.

11. The software system of claim 10 wherein the program instructions for computing a weighting factor include program instructions for computing a least squares minimization of the clutter-associated variance.

12. A software system for reducing clutter in images of the ocean surface, the software system comprising program instructions for:
(a) generating a vertically polarized image, xv, of a selected patch of the ocean surface, the vertically polarized image including a first set of radiance data;
(b) generating a horizontally polarized image, xh, of the selected patch of the ocean surface, the horizontally polarized image including a second set of radiance data;
(c) determining a clutter reduction weighting factor by:
 (1) performing a Fourier-transform on the vertically polarized image, xv, into a transform domain image, kv;
 (2) dividing the kv image into a plurality of subimages, kv(i), corresponding to n bands spanning the wavenumber range, where i=1, ..., n;
 (3) performing an inverse transform of the kv(i) subimages into physical space images xv(i);
 (4) performing a Fourier-transform on the horizontally polarized image, xh, into a transform domain image, kh;
 (5) dividing the kh image into a plurality of subimages, kh(i), corresponding to the n bands spanning the wavenumber range;
 (6) performing an inverse transform of the kh(i) subimages into physical space images xh(i); and
 (7) computing weighting factors w(i) by minimizing the variance the in the weighted-sum xw, where xw(i)=w(i)*xv(i)+(1-w(i))*xh(i); and
(d) combining the first set of radiance data with the second set of radiance data to generate a combined image with reduced wave clutter by computing the expression:

$$xw(i)=w(i)*xv(i)+(1-w(i))*xh(i), \text{ for } i=1,\ldots,n$$

Where xw is the weighted combination image.

13. A system for reducing clutter in passive radiometric images of the ocean surface, the system comprising:
(a) a first polarizer for generating a vertically polarized image of a selected patch of the ocean surface, the vertically polarized image including a first set of radiance data;
(b) a second polarizer for generating a horizontally polarized image of the selected patch of the ocean surface, the horizontally polarized image including a second set of radiance data;
(c) a processor for computing a clutter reduction weighting factor from the first and the second sets of radiance data, wherein the processor is programmed to perform the steps of:
 (1) performing a Fourier-transform on the vertically polarized image, xv, into a transform domain image, kv, which has n wavenumbers;
 (2) dividing the kv image into a plurality of subimages, kv(i), corresponding to the n bands spanning the wavenumber range, where i=1, ..., n;
 (3) performing an inverse transform of the kv(i) subimages into physical space images xv(i);
 (4) performing a Fourier-transform on the horizontally polarized image, xh, into a transform domain image, kh, which has n wavenumbers;
 (5) dividing the kh image into a plurality of subimages, kh(i), corresponding to the n bands spanning the wavenumber range;
 (6) performing an inverse transform of the kh(i) subimages into physical space images xh(i); and
 (7) computing weighting factors w(i) by minimizing the variance in the weighted-sum kw,
 where: kw(i)=w(i)*kw(i)+(1-w(i))*kh(i)*; and
(d) means for combining the first set of radiance data with the second set of radiance data utilizing the weighting factor to generate a combined image with reduced wave clutter, wherein the means for combining computes the expression:

$$xw(i)=w(i)*xv(i)+(1-w(i))*xh(i), \text{ for } i=1,\ldots,n$$

where xw is the weighted combination image.

14. A software system for reducing clutter in images of the ocean surface, the software system comprising program instructions for:
(a) generating a vertically polarized image, xv, of a selected patch of the ocean surface, the vertically polarized image including a first set of radiance data;
(b) generating a horizontally polarized image, xh, of the selected patch of the ocean surface, the horizontally polarized image including a second set of radiance data;
(c) determining a clutter reduction weighting factor by:
 (1) performing a Fourier-transform on the vertically polarized image, xv, into a transform domain image, kv, which has n wavenumbers;
 (2) dividing the kv image into a plurality of subimages, kv(i), corresponding to the n bands spanning the wavenumber range, where i=1, ..., n;

(3) performing an inverse transform of the kv(i) sub-images into physical space images xv(i);
(4) performing a Fourier-transform on the horizontally polarized image, xh, into a transform domain image, kh, which has n wavenumbers;
(5) dividing the kh image into a plurality of subimages, kh(i), corresponding to the n bands spanning the wavenumber range;
(6) performing an inverse transform of the kh(i) sub-images into physical space images xh(i); and
(7) computing weighting factors w(i) by minimizing the variance the in the weighted-sum kw,
where: kw(i)=w(i)*kv(i)+(1−w(i))*kh(i); and
(d) combining the first set of radiance data with the second set of radiance data to generate a combined image with reduced wave clutter by computing the expression:

$$xw(i)=w(i)*xv(i)+(1-w(i))*xh(i), \text{ for } i=1,\ldots,n$$

where xw is the weighted combination image.

15. A method of reducing clutter in passive radiometric images of the ocean surface, the method comprising the steps of:

a. generating a vertically polarized image of a selected patch of the ocean surface, the vertically polarized image comprising a first set of radiance data;

b. generating a horizontally polarized image of the selected patch of the ocean surface, the horizontally polarized image comprising a second set of radiance data;

c. determining a clutter reduction weighting factor from the first and the second sets of radiance data;

d. combining the first set of radiance data with the second set of radiance data by computing the expression:

$N_v$ is radiance measurement of the patch of ocean surface with vertical polarization;

$N_h$ is radiance measurement of a patch of ocean surface with horizontal polarization;

$W_v$ is the weighting factor; and $H_{hv}$ is the weighted combination image.

* * * * *